US012562912B2

(12) United States Patent
Ferenczi

(10) Patent No.: US 12,562,912 B2
(45) Date of Patent: Feb. 24, 2026

(54) APPLICATION PROGRAMMING INTERFACE (API) PROVISIONING USING DECENTRALIZED IDENTITY

(71) Applicant: American Express Travel Related Services Company, Inc., New York, NY (US)

(72) Inventor: Andras L. Ferenczi, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 134 days.

(21) Appl. No.: 18/225,896

(22) Filed: Jul. 25, 2023

(65) Prior Publication Data

US 2025/0038983 A1     Jan. 30, 2025

(51) Int. Cl.
H04L 9/32 (2006.01)
H04L 9/00 (2022.01)

(52) U.S. Cl.
CPC .............. H04L 9/3218 (2013.01); H04L 9/50 (2022.05)

(58) Field of Classification Search
CPC ..... H04L 63/102; H04L 63/08; H04L 9/0891; H04L 9/32; H04L 9/3273
See application file for complete search history.

(56) References Cited

U.S. PATENT DOCUMENTS

| | | | | |
|---|---|---|---|---|
| 11,902,266 | B1 * | 2/2024 | Basta ...................... | H04L 63/08 |
| 2020/0211409 | A1 * | 7/2020 | Latorre .................. | G16H 10/60 |
| 2023/0185894 | A1 * | 6/2023 | Sorensen .............. | H04L 9/3073 |
| | | | | 726/7 |

OTHER PUBLICATIONS

"Auto-GPT, The official website for Auto-GPT", downloaded Jul. 17, 2023 from https://news.agpt.co.
"Auto-GPT—Installation Guide", downloaded Jul. 17, 2023 from https://docs.agpt.co/.
"GitHub—Significant-Gravitas/Audto-GPT—an experimental open-source attempt to make GPT-4 fully autonomous" downloaded Jul. 17, 2023 from □ https://github.com/Significant-Gravitas/Auto-GPT.
"Wikipedia Definition of Auto-GPT", downloaded Jul. 17, 2023 from https://en.wikipedia.org/wiki/Auto-GPT.

* cited by examiner

*Primary Examiner* — Olugbenga O Idowu
(74) *Attorney, Agent, or Firm* — Thomas | Horstemeyer, LLP

(57) ABSTRACT
Disclosed are various embodiments for automating API provisioning for API consumers and API providers using decentralized identity. In various examples, an application that uses APIs to access a resource needed by the application obtains an API key for authentication based at least in part on communications between a consumer decentralized identifier (DID) agent associated with the consumer entity and a provider DID agent associated with the API provider. The provider DID agent can verify the API consumer and generate an API key that can be used by the API consumer for resources requests using the API associated with the API provider. An API service provider can authenticate the API consumer and provide the resource to the API consumer during a session in which the API consumer is authenticated.

20 Claims, 5 Drawing Sheets

100

APPLICATION PROGRAMMING INTERFACE (API) PROVISIONING USING DECENTRALIZED IDENTITY

BACKGROUND

Application programming interface (API) provisioning involves extensive interactions between providers and consumers of APIs. The most typical interaction is for an API consumer to identify itself on the provider's web page and obtain an API key. The API key can be used by the API consumer whenever the API consumer invokes the corresponding API. For example, the API key may be used as basic authentication such that when the API is invoked, the API key can be included in the API authentication header or used as a user identifier and/or password to obtain a JSON web token (JWT).

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
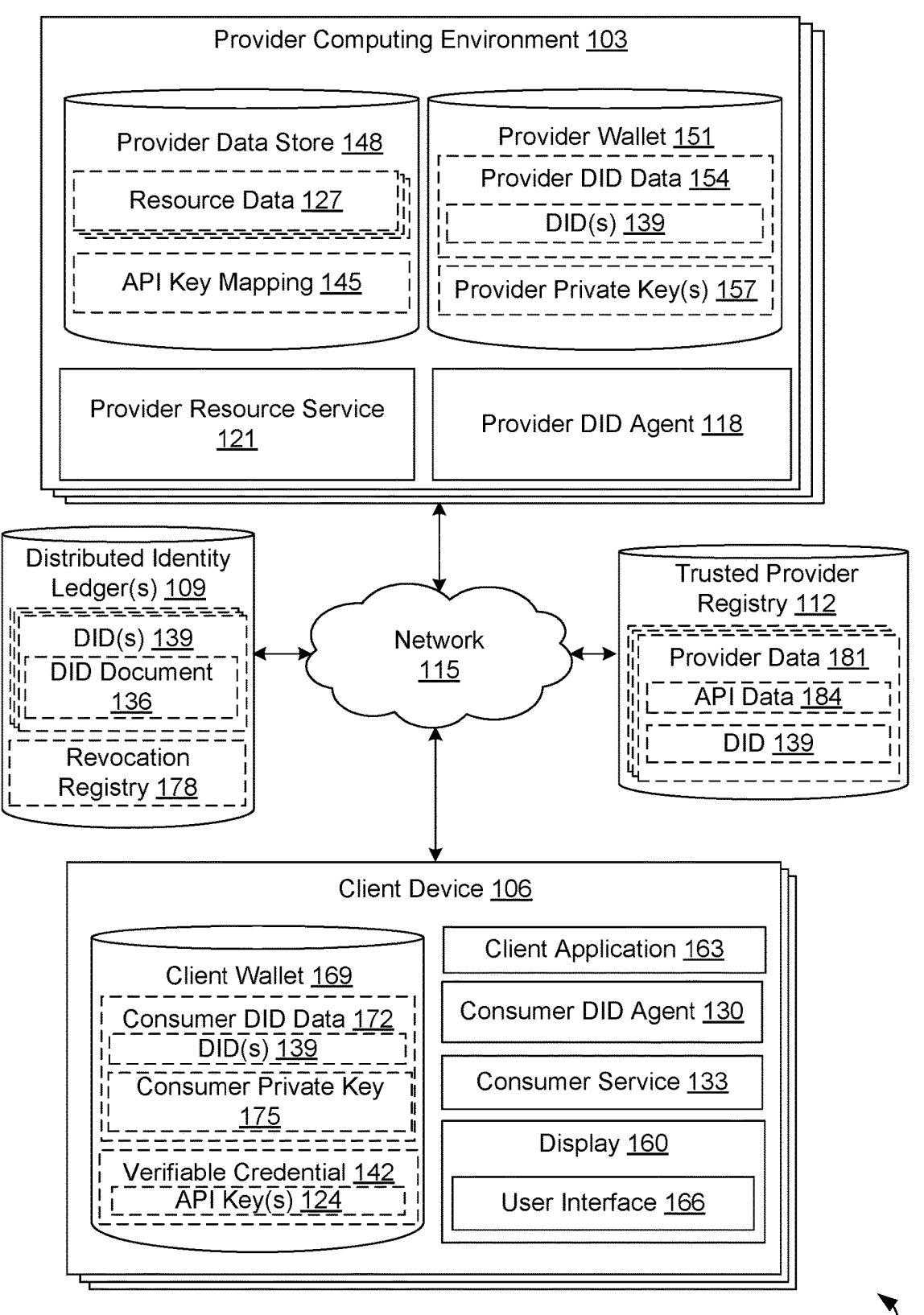
FIG. 1 is a drawing of a network environment according to various embodiments of the present disclosure.

Disclosed are various approaches for automating API provisioning for API consumers and API providers using decentralized identity. In various examples, API provisioning requires an API consumer to obtain an API key from an API provider for accessing one or more resources provided by the API provider. An API key is used for authentication purposes and comprises code, an identifier, a token, and/or other type of authentication object. To obtain the API key, the holder of the API key (e.g., API consumer) interacts with an API provider to be granted permission to interact with an API to obtain resources associated with the API and provided by the API provider. According to various examples of the present disclosure, API provisioning can be automated and simplified with the use of decentralized identity.

According to various examples, an API consumer can correspond to an application associated with an entity (e.g., consumer) that uses an API to access a resource needed by the application. Instead of having to have multiple interactions between the consumer and the API provider to obtain an API key for authentication to use the API during execution of the application, an API consumer can request the API key based at least in part on communications between a consumer decentralized identifier (DID) agent associated with the consumer entity and a provider DID agent associated with the API provider. In this example, the provider DID agent can verify the API consumer and generate an API key that can be used by the API consumer for resources requests using the API associated with the API provider.

In various examples, the API key can be generated as a claim of a verifiable credential (VC) that can be issued to the API consumer in response to the API key request. Once the API key is obtained, the API consumer can request the resource from the API provider via an API call to an API service provider. The API call can include the API key for authentication. The API key included in the API call can be in the form of the VC including the API key, the API key, and/or a cryptographic proof of the API key to the API service provider. The API service provider authenticates the API consumer and provides the resource to the API consumer during a session in which the API consumer is authenticated.

In one example, an API consumer can correspond to an autonomous learning language model (LLM) agent (e.g., Auto-GPT) that is associated with an entity and is trained to respond to questions provided by a user. In this non-limiting example, a user can ask the following question: "How did XX stock price perform today and what do you expect to happen tomorrow?" In response, the API consumer application can extract intents and/or keywords from the question and, based at least in part on the intents and/or keywords, identify an API that can provide the resources (e.g., stock price and future expectations) to allow the API consumer to respond to the inquiry. However, the API consumer will need to obtain an API key to access the resources from the identified API. Using the concepts of decentralized identity, the API consumer can obtain an API key and submit the API key or cryptographic proof of the API key to an API provider service for authentication to receive the desired resource (e.g., stock price and future expectations).

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a network environment 100 according to various embodiments. The network environment 100 can include a provider computing environment 103, a client device 106, a distributed identity ledger 109, and a trusted provider registry 112, which can be in data communication with each other via a network 115.

The network 115 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 115 can also include a combination of two or more networks 115. Examples of networks 115 can include the Internet, intranets, extranets, virtual private networks (VPNs), and similar networks.

The provider computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, provider computing environment 103 can employ a plurality of computing devices that can be arranged in one or more server banks or computer banks or other arrangements. Such computing devices can be located in a single installation or can be distributed among many different geographical locations. For example, the provider computing environment 103 can include a plurality of computing devices that together can include a hosted computing resource, a grid computing resource or any other distributed computing arrangement. In some cases, the provider computing environment 103 can correspond to an elastic computing resource where the allotted capacity of processing, network, storage, or other computing-related resources can vary over time.

Various applications or other functionality can be executed in the provider computing environment 103. The components executed on the provider computing environment 103 include a provider DID agent 118, a provider resource service 121, and other applications, services, processes, systems, engines, or functionality not discussed in detail herein.

The provider DID agent 118 can be executed to verify entities (e.g., consumers) requesting an API key 124 for access to resource data 127 provided by an API provider associated with the computing environment 103 via the provider resource service 121. In various examples, the provider DID agent 118 can receive an API key request from a consumer DID agent 130 associated with a consumer service 133 wanting to interact with a provider resource service 121 (e.g., API gateway) to access one or more resources from the resource data 127.

In various examples, the provider DID agent 118 verifies the requesting entity (e.g., consumer associated with the consumer DID agent 130 and/or consumer service 133) to determine that the requesting entity is a trusted entity. In various examples, the provider DID agent 118 can verify the requesting entity by obtaining a DID document 136 from the distributed identity ledger 109 based at least in part on a DID 139 associated with the requesting entity. In some examples, the DID 139 is included in the API key request. In other examples, the DID 139 is provided or obtained separately from the API key request. In various examples, the DID document 136 can include and/or reference a verifiable credential (VC) 142, a proof associated with the VC 142, a credential document, and/or other type of credential has been issued by a trusted party. The provider DID agent 118 can verify the requesting entity using a variety of verification approaches, such as the World Wide Web Consortium's (W3C's) Decentralized Identifier (DID) standard. If the requesting entity cannot be verified, the provider DID agent 118 can reject the API key request.

The provider DID agent 118 can further be executed to issue an API key 124 for the requesting entity in response to verifying the requesting entity (e.g., consumer entity). In various examples, the API key can be generated as a claim of a VC 142 that can be issued to the consumer service 133 by the provider DID agent 118. In various examples, a VC 142 corresponds to a digital credential used to identify an attribute (e.g., qualification, component, authority, achievement, personally quality, etc.) associated with the credential holder. In this example, the VC 142 can be generated to identify an API key issued to the requesting entity (e.g., consumer service 133). In various examples, the API key 124 is included in the VC 142 as a claim of the VC. 142. For example, the verifiable credential can be associated with the consumer service 133 by being linked with and/or otherwise associated with a DID 139 of the consumer entity associated with the consumer service 133. In various examples, the VC 142 and/or API key 124 can be generated to include access permissions with respect to the API. For example, the permissions can comprise an expiration date, limitations on data (or resources) that can be accessed, time/day access limits (e.g., access available during 9 am-12 pm, access available only on Mondays and Fridays, etc.), and/or other types of permissions. The VC can be generated using a variety of approaches, such as the World Wide Web Consortium's (W3C's) Decentralized Identifier (DID) standard.

The provider DID agent 118 can further be executed to generate an API key mapping 145. The API key mapping 145 comprises a mapping of the API key 124 and the consumer DID 139. The provider DID agent 118 can be provided to the provider resource service 121 that is the entry point for requests to an API. Accordingly, the API key mapping 145 can be used by the provider resource service 121 to verify that the API key 124 has been issued and is associated with the DID 139 of the requesting party (e.g., consumer service 133).

It should be noted that although the provider DID agent 118 is illustrated in FIG. 1 as being located in the computing environment 103 associated with the API provider, in some examples, the provider DID agent 118 can be executed in another cloud-based computing environment such as, for example, Amazon Web Services® (AWS®), Azure®, Google Cloud Platform® (GCP®) and/or other type of cloud platform.

The provider resource service 121 can be executed to respond to an API call by a consumer service 133 requesting access to a resource accessible through the provider resource service 121. In various examples, the provider resource service 121 can include an API gateway which is used as the entry point for requests to an API originated by a consumer service 133 requesting access to a resource. In various examples, the provider resource service 121 authenticates the consumer service 133 prior to providing the requested resource to the consumer service 133. In various examples, the consumer service 133 provides the API key to the provider resource service 121. The API key 124 can be provided to the provider resource service in the form of a VC 142, the API key 124, or a cryptographic proof of the API key 124.

In various examples, the provider resource service 121 verifies the API key 124 using various verification methods, such as the verification methods supported by the World Wide Web Consortium's (W3C's) Decentralized Identifier (DID) standard. In various examples, the provider resource service 121 can compare the API key 124 and the DID 139 of the consumer service 133 with the API key mapping 145 for verification purposes. For example, if the API key 124 and DID 139 in the API key mapping 145 matches the API key 124 and corresponding DID 139 provided in the authentication request, the provider resource service 121 can determine that the consumer service 133 is verified.

In various examples, the API key 124 and/or corresponding VC 142 can be generated to include access permissions with respect to the API and resources that can be provided. For example, the permissions can include an expiration date, limitations on data (or resources) that can be accessed, time/day access limits (e.g., access available during 9 am-12 pm, access available only on Mondays and Fridays, etc.), and/or other types of permissions. Accordingly, the provider resource service 121 can determine if the permissions are valid with respect to the API resource request. For example, if the API key has expired based at least in part on the permissions, the provider resource service 121 can deny the authentication request of the consumer service 133 to access a given resource. In another example, if the API resource request is for a resource that is not permitted by the API key, the provider resource service 121 can still authenticate the consumer service 133, but deny the request of the consumer service 133 for the given resource.

Also, various data is stored in a provider data store 148 that is accessible to the provider computing environment 103. The provider data store 148 can be representative of a plurality of provider data stores 148, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the provider data store 148 is associated with the operation of the various applications or functional entities described below. This data can include resource data 127, an API key mapping 145, and potentially other data.

The resource data 127 can represent data and/or resources containing data needed to respond to an API request. In various examples, an API corresponds to a type of information or resource. For example, if the provider resource service 121 comprises an API gateway which is used as the entry point for requests to an API for stock market data, the resource data 127 can include data associated with the stock market, including, for example, current stock market data, past stock market data, and/or future predictions of stock market data.

The API key mapping 145 comprises a mapping of the API key 124 and the consumer DID 139. The provider DID agent 118 can provide the API key mapping 145 to the provider resource service 121. Accordingly, the API key mapping 145 can be used by the provider resource service 121 to verify that the API key 124 has been issued and is associated with the DID 139 of the requesting party (e.g., consumer service 133).

In various examples, the provider computing environment 103 comprises a provider wallet 151. The provider wallet 151 corresponds to a digital identity wallet for securely storing provider DID data 154 and storing the provider private keys 157 associated with one or more DIDs 139 created for API provider and/or subjects associated with the API provider. The provider wallet 151 can comprise a hard wallet or a soft wallet. Although the provider wallet 151 is illustrated in FIG. 1 as being part of the provider computing environment 103, it is understood that the wallet 190 can comprise a separate storage device that can be attached to or otherwise communicatively coupled to the provider computing environment 103.

The provider DID data 154 included in the provider wallet 151 can include one or more DIDs 139 and corresponding key-pairs. A DID 139 corresponds to an identifier that enables verifiable, decentralized digital identity of a subject (e.g., person, organization, thing, etc.). In various examples, a DID 139 can correspond to an address to a DID document 136 that includes information associated with the subject and is stored in the distributed identity ledger 109. A DID 139 can used by an entity to assert an identity to others and may be stored in the identity ledger 109 to allow others subjects to verify the subject's identity. A DID 139 can be implemented using a variety of approaches, such as the World Wide Web Consortium's (W3C's) Decentralized Identifier (DID) standard.

The provider private key 157 can correspond to a private key of a public-private key pair controlled by a provider entity associated with the provider computing environment 103. The key-pair can be generated using various approaches, such as elliptic curve cryptography (ECC) approaches or using approaches based at least in part on the Rivest-Shamir-Adleman (RSA) algorithm. The provider private key 157 can remain stored in the provider wallet 151 and/or the provider data store 148 and can be used to sign any cryptographic challenges sent to the provider DID agent 118 or the provider resource service 121 for verification. In addition, the provider private key 157 can be used by the provider DID agent 118 to sign issued VCs 142 and/or API keys 124 created so that verifiers can verify that the VCs 142 and/or API keys 124 are issued by a trusted entity (e.g., provider entity).

The client device 106 is representative of a plurality of client devices that can be coupled to the network 115. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 160, such as liquid crystal displays (LCDs), gas plasma-based flat panel displays, organic light emitting diode (OLED) displays, electrophoretic ink ("E-ink") displays, projectors, or other types of display devices. In some instances, the display 160 can be a component of the client device 106 or can be connected to the client device 106 through a wired or wireless connection.

The client device 106 can be configured to execute various applications such as a client application 163, a consumer DID agent 130, a consumer service 133, or other applications. The client application 163 can be executed in a client device 106 to access network content served up by the provider computing environment 103 or other servers, thereby rendering a user interface 166 on the display 160. To this end, the client application 163 can include a browser, a dedicated application, or other executable, and the user interface 166 can include a network page, an application screen, or other user mechanism for obtaining user input. The client device 106 can be configured to execute applications beyond the client application 163 such as email applications, social networking applications, word processors, spreadsheets, or other applications.

The consumer DID agent 130 can be executed to communicate with the provider DID agent 118 of the provider computing environment 103. In various examples, the consumer DID agent 130 can be executed to fetch DID documents 136 associated with DIDs 139 of the API provider. The consumer DID agent 130 can identify a URL or other location indicator associated with the provider DID agent 118 to allow the consumer DID agent 130 to interact with the provider DID agent 118.

In various examples, the consumer DID agent 130 can function as an intermediary between a consumer service 133 and the provider DID agent 118 with respect to API key requests initiated by a consumer service 133. For example, once the consumer DID agent 130 has access to the provider DID agent 118, the consumer DID agent 130 can send an API key request on behalf of the consumer service 133 for an API key. In some examples, the API key request includes a DID 139 associated with the consumer service 133 (e.g., consumer entity). In other examples, the consumer DID agent 130 can provide the DID 139 in response to a request by the provider DID agent 118. The consumer DID agent 130 can receive the API key 124 and/or VC 142 including the API key 124 from the provider DID agent 118 and store the API key 124 and/or VC 142 including the API key 124 in the client wallet 169 and/or other data store associated with the client device 106. The consumer DID agent 130 can further notify the consumer service 133 of the receipt of the API key 124.

In various examples, the consumer DID agent 130 can generate consumer DID data 172 including decentralized identifiers (DIDs) 139. The consumer DID agent 130 can store and access the consumer DID data 172 and verifiable credentials 142 from a corresponding client wallet 169. In various examples, the client wallet 169 corresponds to a digital identity wallet for securely storing the consumer DID data 172, verifiable credentials 142, and storing the consumer private keys 175 associated with one or more DIDs 139 created for the given consumer. The client wallet 169 can include a hardware wallet or a software wallet. Although the client wallet 169 is illustrated in FIG. 1 as being part of the client device 106, it is understood that the client wallet 169 can include a separate storage device that can be attached to or otherwise communicatively coupled to the client device 106.

The consumer DID data 172 included in the client wallet 169 and generated by the consumer DID agent 130 can include one or more DIDs 139 and corresponding key-pairs. A DID 139 corresponds to an identifier that enables verifiable, decentralized digital identity of a subject (e.g., person, organization, thing, etc.). In this example, the DID 139 can be used to represent the identity of consumer service 133 and/or consumer entity associated with the consumer service 133. In various examples, a DID 139 can correspond to an address to a DID document 136 that includes information associated with the subject and is stored in the distributed identity ledger 109. A DID 139 can be used by an individual to assert his or her identity to others and may be stored in the identity ledger 109 to allow others to verify the entity's identity. A DID 139 can be implemented using a variety of approaches, such as the World Wide Web Consortium's (W3C's) Decentralized Identifier (DID) standard.

The consumer private key 175 can correspond to a private key of a public-private key pair controlled by a consumer entity associated with the client device 106. The key-pair can be generated using various approaches, such as elliptic curve cryptography (ECC) approaches or using approaches based at least in part on the Rivest-Shamir-Adleman (RSA) algorithm. The consumer private key 175 remains stored in the client wallet 169, and can be used to sign any cryptographic challenges sent to the consumer DID agent 130 or the consumer service 133 for verification.

In various examples, a verifiable credential 142 corresponds to a digital credential used to identify an attribute (e.g., qualification, component, authority, achievement, personally quality, etc.) associated with the credential holder. For example, the verifiable credential 142 can be associated with the consumer service 133 (e.g., consumer entity) by being linked with and/or otherwise associated with the DID 139 of the consumer service 133 (e.g., consumer entity). The verifiable credential 142 can include information represented by a physical credential (e.g., passport, driver's license, birth certificate, etc.) or a non-physical credential (e.g., bank, charge, credit, or debit account ownership; social media account ownership; email account ownership; etc.) that identifies one or more attributes associated with the consumer service 133. In various examples, the VC 142 can be issued to the consumer entity by the provider DID agent 118 in response to an API key request. For example, the VC 142 can be issued to represent the issuance of an API key 124 for authentication of the consumer service 133 to receive resources in response to requests for resources to the provider resource service 121 via an API. In some examples, the API key 124 is included in a claim of the VC 142.

In various examples, the VC and/or API key can be generated to include access permissions with respect to the API. For example, the permissions can include an expiration date or time, limitations on data (or resources) that can be accessed, time/day access limits (e.g., access available during 9 am-12 pm, access available only on Mondays and Fridays, etc.), and/or other types of permissions.

The consumer service 133 can correspond to an application that uses APIs to access a resource needed by the application to complete a task or request. In various examples, the consumer service 133 can identify an API that needs to be called in order to perform a task or request. In some examples, the consumer service 133 has knowledge of the API and corresponding API provider required to perform the task or request. As such, the consumer service 133 may have knowledge of the DID 139 associated with the API provider. In other examples, criteria associated with the task or request (e.g., keywords, extracted intent, etc.) can be used to identify an API capable of providing the resources needed to perform the task or request. In this example, the consumer service 133 can query the trusted provider registry 112 to identify an API that satisfies the needs of the consumer service 133 to perform the task or request. The trusted provider registry 112 can return a DID 139 associated with the identified API and API provider.

The consumer service 133 can request, via the consumer DID agent 130, to establish a communication session with a provider DID agent 118 using the DID 139. For example, the consumer service 133 can send a request to the consumer DID agent 130 to establish communication with the provider DID agent 118 and the request can include the DID 139 of the API provider. Accordingly, the consumer DID agent 130 can access the DID document 136 associated with the DID 139 from the distribute identity ledger 109 and identify the URL or location address for initiating communication with the provider DID agent 118. Upon determining that the consumer DID agent 130 can communicate with the provider DID agent 118, the consumer service 133 can send an API key request, via the consumer DID agent 130, to the provider DID agent 118 for an API key to authenticate the consumer service 133 and allow the consumer service 133 access to resources provided by the provider resource service 121 via an API call.

The consumer service 133 can invoke an API call including the API key. By invoking the API call, the provider resource service 121 can authenticate the consumer service 133 based at least in part on the API key provided in the API call. In various examples, the API key can be included in the API call as the VC 142 including the API key as a claim, as a cryptographic proof of the API key, or other form that allows the provider resource service 121 to authenticate that the consumer service 133 has been provided the API key for access to resources provided by the provider resource service 121.

The distributed identity ledger 109 represents synchronized, eventually consistent, data stores spread across multiple nodes in different geographic or network locations. Each node in the distributed identity ledger 109 can contain a replicated copy of the distributed identity ledger 109, including all data stored in the distributed identity ledger 109. Records of transactions involving the distributed identity ledger 109 can be shared or replicated using a peer-to-peer network connecting the individual nodes that form the distributed identity ledger 109. Once a transaction or record is recorded in the distributed identity ledger 109, it can be replicated across the peer-to-peer network until the record is eventually recorded with all nodes. Various consensus methods can be used to ensure that data is written reliably to the distributed identity ledger 109. In some implementations, data, once written to the distributed identity ledger 109, is immutable. Examples of a distributed data store that can be used for the distributed identity ledger 109 can include various types of blockchains, distributed hash tables (DHTs), and similar data structures. Various data can be stored in the distributed identity ledger 109. For example, the distributed identity ledger 109 can include DIDs 139 associated with API provider subjects associated with the provider computing environment 103 and/or consumer subjects associated with the client device 106.

A DID 139 corresponds to an identifier that enables verifiable, decentralized digital identity of a subject (e.g., person, organization, thing, etc.). In this example, the DID 139 can be used to represent the identity of an API provider subject and/or a consumer subject (e.g., consumer entity, consumer service 133, etc.). In various examples, a DID 139 can correspond to an address to a DID document 136 that includes information associated with the subject. For example, the DID document 136 can comprise a set of data describing the subject and can include various information (e.g., cryptographic keys) that can used to authenticate the subject. In various examples, the DID document 136 associated with an API provider subject can include an address or pathway for accessing the provider DID agent 118. The revocation registry 178 stored in the distributed identity ledger 109 can be updated to indicate that a corresponding credential or DID 139 has been revoked. In various examples, the DID 139, the DID document 136, and the revocation registry 178 can be implemented using various standards, such as the World Wide Web Consortium's (W3C's) Decentralized Identifier (DID) standard.

The trusted provider registry 112 can correspond to a registry of API providers and include information about different types of services associated with the APIs associated with the API providers. In various examples, to be included in the trusted provider registry 112, an API provider and/or the corresponding API represented in the trusted provider registry 112 can be verified or otherwise trusted by the entity hosting the trusted provider registry 112.

In various examples, the trusted provider registry 112 includes provider data 181 associated with the API providers. The provider data 181 can include API data 184, DIDs 139, and/or other data. The API data 184 can correspond to API metadata providing characteristics or properties of what a given API can provide and/or what the given API does. For example, if the API corresponds to a news outlet, the API data 184 may include metadata related to the type of news provided by the API and/or other data.

In some examples, the trusted provider registry 112 can include a reputational ledger (not shown) that can be updated with feedback provided by consumers. For example, the feedback can be positive or negative regarding the services provided by a given API and a consumer can review the feedback in the reputational ledger to determine whether or not to use or otherwise invoke the corresponding API.

Next, a general description of the operation of the various components of the network environment 100 is provided with respect to FIGS. 2A-4. Although the following description provides one example of the various operations of the components of the network environment 100 or interactions between components of the network environment 100, other operations or interactions between the components are also encompassed by the various embodiments of the present disclosure.

Figure 2A:
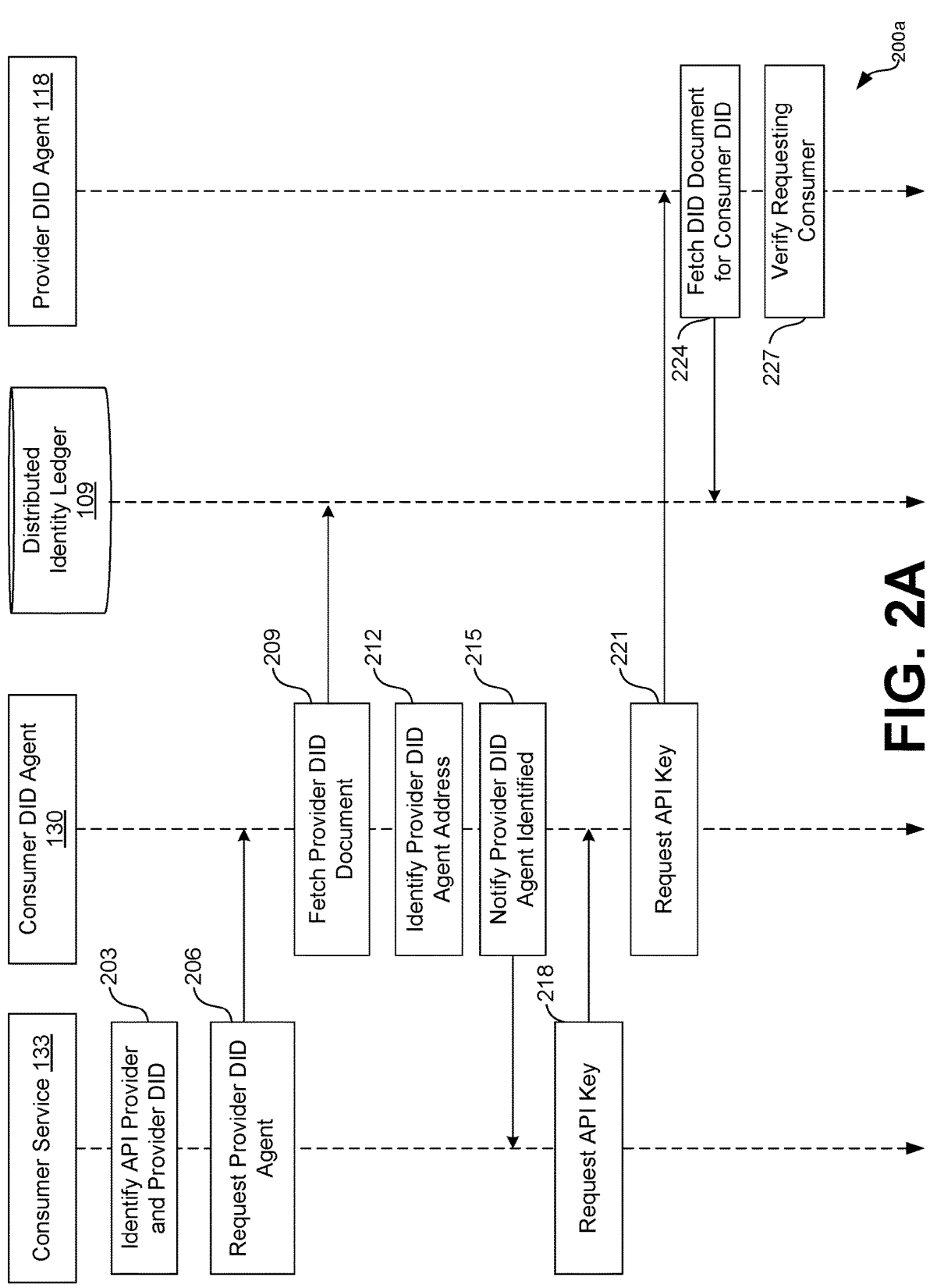
FIGS. 2A-2B are sequence diagrams illustrating examples of functionality in the network environment of FIG. 1 according to various embodiments of the present disclosure.
Figure 2B:
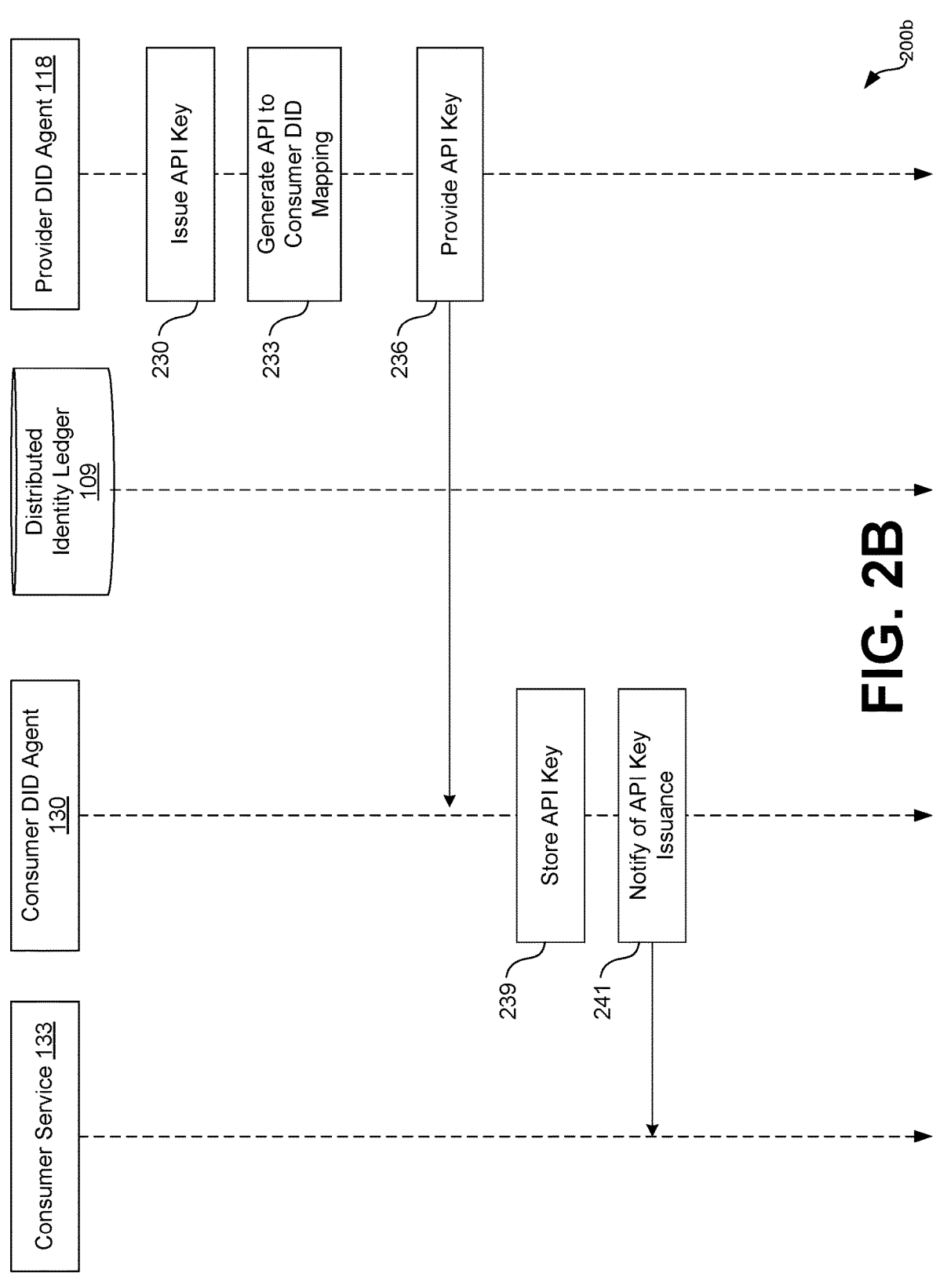

To begin, FIGS. 2A and 2B illustrate a sequence diagram 200 (e.g., 200a, 200b) that provides an example of the operation of the components of the network environment 100. It is understood that the sequence diagram 200 of FIGS. 2A and 2B provides merely an example of the many different types of functional arrangements that can be employed to implement the operation of the depicted portion of the network environment 100. As an alternative, the sequence diagram 200 of FIGS. 2A and 2B can be viewed as depicting an example of elements of a method implemented within the network environment 100. In particular, the sequence diagram 200 of FIGS. 2A and 2B depicts the functionality associated with API provisioning using decentralized identity.

Beginning with block 203, a consumer service 133 identifies an API provider and provider DID 139. For example, the consumer service 133 executing on the client device 106 can receive a request for information that requires the use of an API to respond. In some examples, the consumer service 133 is aware of the API required for obtaining the resource required to satisfy the request and has knowledge of the DID 139 of the API provider. For example, the consumer service 133 can be programmed with knowledge of different APIs to use for different tasks.

In other examples where an application can orchestrate functionality dynamically based in part on context and/or other factors, the consumer service 133 can identify an API by querying a trusted provider registry 112 that includes API data 184 defining what different APIs do and how they perform. In some examples, the consumer service 133 sends a query request to the trusted provider registry 112 identifying resource criteria associated with what the consumer service 133 needs to perform a task or respond. In various examples, the API criteria can include intents and/or keywords (e.g., resource criteria) associated with context of the request for information received by the consumer service 133.

For example, the consumer service 133 can correspond to an autonomous learning language model (LLM) agent (e.g., Auto-GPT) that is trained to respond to questions provided by a user interacting with the client device 106. In this non-limiting example, a user can ask the following question: "How did XX stock price perform today and what do you expect to happen tomorrow?" In response, the consumer service 133 can extract intents and/or keywords from the question and, based at least in part on the intents and/or keywords, identify an API that can provide the resources (e.g., stock price and future expectations) to allow the consumer service 133 to respond to the inquiry. In various examples, API data 184 associated with different APIs can be compared to resource criteria (e.g., keywords or intents associated with the resources needed) to identify one or more APIs. The trusted provider repository can return the API and DID 139 associated with the API provider that matches the resource criteria. In other examples, the consumer service 133 can identify the API(s) by comparing the API data 184 with the resource criteria.

At block 206, the consumer service 133 sends a request to the consumer DID agent 130 for the provider DID agent 118. For example, the consumer service 133 can include the DID 139 of the API provider to the consumer DID agent 130 requesting that the consumer DID agent 130 determine how to contact the provider DID agent 118.

At block 209, the consumer DID agent 130 fetches the DID document 136 associated with the DID 139 of the API provider from the distributed identity ledger 109. The DID 139 can correspond to an address to a DID document 136 that includes information associated with the subject and is stored in the distributed identity ledger 109.

At block 212, the consumer DID agent 130 identifies address or pathway for the provider DID agent 118. The DID document 136 can include a uniform resource locator (URL) or other location address or pathway of the provider DID agent 118 that the consumer DID agent 130 can use to initiate a communication session with the provider DID agent 118. Accordingly, the consumer DID agent 130 identifies the address or pathway for the provider DID agent 118 in the DID document 136.

At block 215, the consumer DID agent 130 notifies the consumer service 133 that the provider DID agent 118 is identified. For example, the consumer DID agent 130 can send a notification to the consumer service 133 indicating that a communication session has been established between the consumer DID agent 130 and the provider DID agent 118 or that the consumer DID agent 130 can establish a communication session with the provider DID agent 118 based at least in part on the identification of the address or pathway associated with the provider DID agent 118 that is retrieved from the DID document 136.

At block 218, the consumer service 133 generates an API key request for requesting an API key 124 that can be used by the consumer service 133 to authenticate the consumer service 133 with the corresponding API. In various examples, the API key request can include a DID 139 associated with the consumer service 133 and/or other consumer subject associated with the consumer service 133. The consumer service 133 can send the API key request to the consumer DID agent 130 for transfer to the provider DID agent 118.

At block 221, the consumer DID agent 130 sends the API key request to the provider DID agent 118. In various examples, the API key request is sent to the provider DID agent 118 via the pathway or address identified in the DID document 136. In various examples, the consumer DID agent 130 establishes a communication session with the provider DID agent 118 at the time of sending the API key request. In other examples, the consumer DID agent 130 establishes the communication session with the provider DID agent 118 prior to sending the API key request.

At block 224, the provider DID agent 118 fetches the DID document 136 associated with the consumer DID 139 of the consumer subject. In some examples, the consumer DID 139 is included in the API key request. In other examples, requests and receives the consumer DID 139 from the consumer DID agent 130 separately from the API key request.

At block 227, the provider DID agent 118 verifies the requesting consumer. For example, the provider DID agent 118 can verify one or more credentials identified in the DID document 136 of the consumer to verify that the one or more credentials are issued by a trusted third party. In this example, the DID document 136 can reference a credential document that can be used to verify the identity of the requesting consumer. The provider DID agent 118 can verify the requesting consumer using a variety of verification methods, such as verification methods of the World Wide Web Consortium's (W3C's) Decentralized Identifier (DID) standard.

At block 230, the provider DID agent 118 issues the API key 124. The API key 124 is used for authentication purposes and comprises code, an identifier, a token, and/or other type of authentication object. In some examples, the API key 124 is issued as a verifiable credential 142 in response to an API key request. For example, the VC 142 can be issued to represent the issuance of an API key 124 for authentication of the consumer service 133 to receive resources in response to requests for resources to the provider resource service 121 via an API. In some examples, the API key 124 is included in a claim of the VC 142. In various examples, the VC and/or API key can be generated to include access permissions with respect to the API. For example, the permissions can include an expiration date or time, limitations on data (or resources) that can be accessed, time/day access limits (e.g., access available during 9 am-12 pm, access available only on Mondays and Fridays, etc.), and/or other types of permissions.

At block 233, the provider DID agent 118 generates the API key mapping 145 associating the API key 124 with the DID 139 of the consumer subject. The API key mapping 145 comprises a mapping of the API key 124 and the consumer DID 139. The provider DID agent 118 can provide the API key mapping 145 to the provider resource service 121 (e.g., entry point for requests to an API). Accordingly, the API key mapping 145 can be used by the provider resource service 121 to verify that the API key 124 has been issued and is associated with the DID 139 of the requesting party (e.g., consumer service 133).

At block 236, the provider DID agent 118 transmits the API key 124 to the consumer DID agent 130. Accordingly, the API key 124 has been provisioned by the provider DID agent 118 in response to verifying the consumer DID 139. In various examples, the API key 124 can be transmitted to the consumer DID agent 130 in the form of a VC 142 where the API key 124 is a claim of the VC 142 and permission associated with the use of the API key 124 are defined by claims of the VC 142.

At block 239, the consumer DID agent 130 stores the API key 124. For example, the consumer DID agent 130 stores the API key 124 and/or VC 142 including the API key 124 in the client wallet 169 and/or other data store associated with the client device 106.

At block 241, the consumer DID agent 130 notifies the consumer service 133 of the receipt of the API key 124. In some examples, the notification to the consumer service 133 can include the API key 124 and/or the VC 142 including the API key 124. In other examples, the notification can indicate a location at which the API key 124 is stored so that the consumer service 133 can access the API key 124 when needed to invoke an API associated with the API key 124. Thereafter, this portion of the process proceeds to completion.

Figure 3:
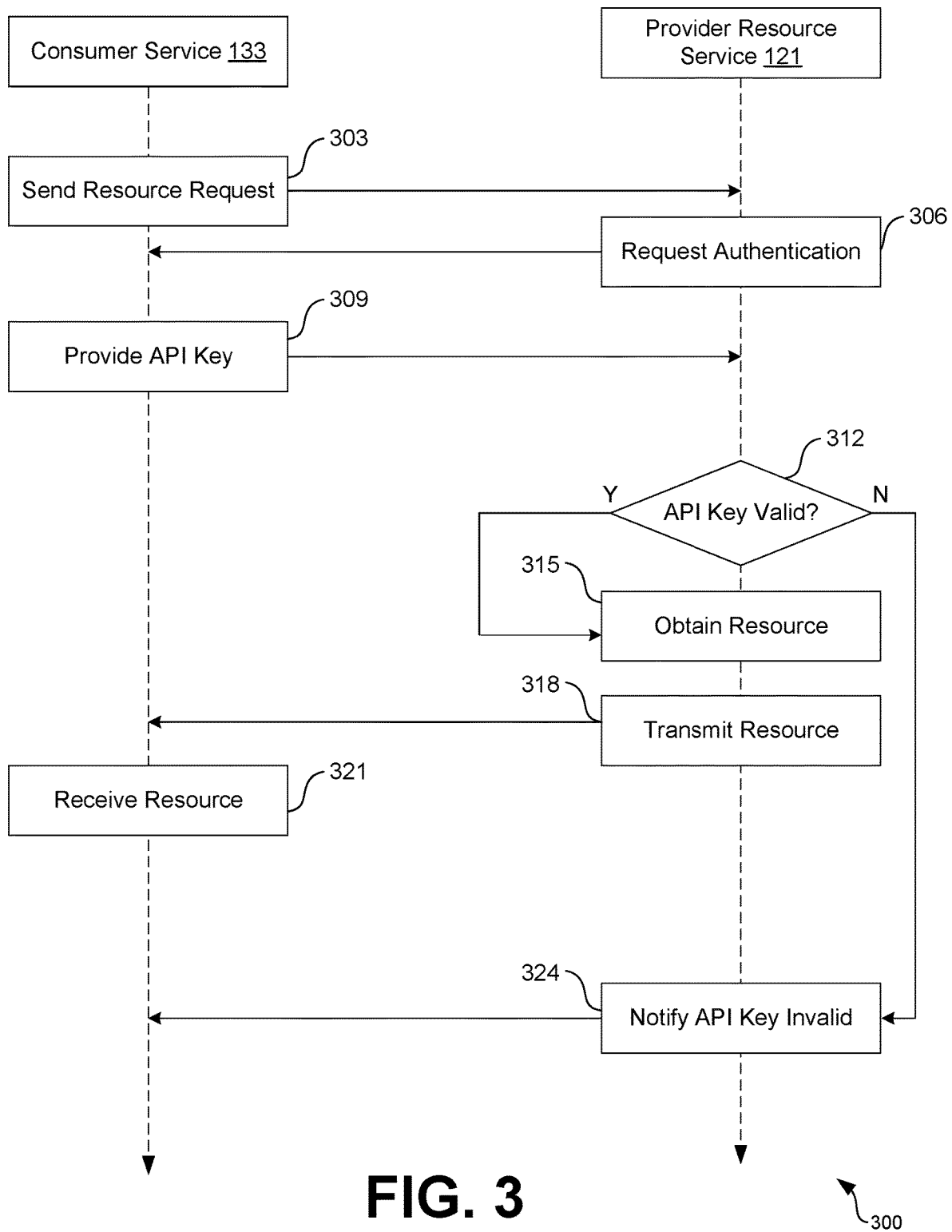
FIGS. 3-4 are flowcharts illustrating examples of functionality implemented as portions of an application executed in a client device in the network environment of FIG. 1 according to various embodiments of the present disclosure.

Referring next to FIG. 3, shown is a sequence diagram 300 that provides an example of the operation of the components of the network environment 100. It is understood that the sequence diagram 300 of FIG. 3 provides merely an example of the many different types of functional arrangements that can be employed to implement the operation of the depicted portion of the network environment 100. As an alternative, the sequence diagram 300 of FIG. 3 can be viewed as depicting an example of elements of a method implemented within the network environment 100. In particular, the sequence diagram 300 of FIG. 3 depicts the functionality associated with the use of the API key 124 provisioned using decentralized identity.

Beginning with block 303, the consumer service 133 can send a resource request to the provider resource service 121. In various examples, the consumer service 133 sends the resource request by invoking an API call associated with the provider resource service 121. In various examples, the provider resource service 121 is a gateway service for the API.

At block 306, the provider resource service 121 can send an authentication request to the consumer service 133 requesting authentication of the consumer service 133 prior to responding to the resource request. The authentication request includes a request for an API key 124 associated with the API call. In some examples, the API key 124 is included in the resource request (e.g., API call) and the authentication request is not necessary. However, in some examples, the API key 124 is not included in the resource request and the provider resource service 121 will send the authentication request.

At block 309, the consumer service 133 responds to the authentication request by providing the API key 124 to the provider resource service 121. In some examples, the consumer service 133 provides the API key 124 to the provider resource service in the form of the API key 124, a VC 142 that includes the API key 124, or a cryptographic proof of the API key 124.

At block 312, the consumer service 133 can determine if the API key 124 is valid. In various examples, the API key 124 and/or corresponding VC 142 can be generated to include access permissions with respect to the API and resources that can be provided. For example, the permissions can include an expiration date or time, limitations on data (or resources) that can be accessed, time/day access limits (e.g., access available during 9 am-12 pm, access available only on Mondays and Fridays, etc.), and/or other types of permissions. Accordingly, the provider resource service 121 can determine if the permissions are valid with respect to the API resource request. For example, if the API key 124 has expired based at least in part on the permissions, the provider resource service 121 can determine that the API key 124 is not valid and deny the authentication request of the consumer service 133 to access a given resource.

In another example, if the API resource request is for a resource that is not permitted by the API key 124, the provider resource service 121 can determine that the API key 124 is not valid for the given API resource request. In some examples, the consumer service 133 can determine if the API key 124 is valid based at least in part on verifying a cryptographic proof associated with the API key 124. In some examples, the consumer service 133 can determine the properties of the API key 124 and the DID 139 of the associated consumer and compare the API key 124 and the DID 139 with the API key mapping 145. If the API key 124 is considered valid, the provider resource service 121 can proceed to block 315. Otherwise, the provider resource service 121 can proceed to block 324 where the provider resource service 121 notifies the consumer service 133 that the API key 124 is invalid and that the resource request has been denied because the consumer service 133 cannot be authenticated by the provider resource service 121.

At block 315, the provider resource service 121 can obtain the resources associated with the resource request. For example, the resource request can include data identify what type of resource or resources are being requested. The provider resource service 121 can obtain the requested resources from the resource data 127 or other API resource to resolve the API resource request.

At block 318, the provider resources service 121 can transmit the requested resource to the consumer service 133. In particular, the provider resource service 121 can respond to the invoked API call by providing the consumer service 133 with the information request. For example, if the provider resource service 121 and the corresponding API provide information about the stock market and the request included a request for a stock market price for a given stock, the requested resource can include the stock market price from the given stock.

At block 321, the consumer service 133 can receive the requested resource from the provider resource service. Upon receiving the requested resource, the consumer service 133 can proceed with performance of the task that required the information that initiated the API call and need for the requested resource. Thereafter, this portion of the process proceeds to completion.

Figure 4:
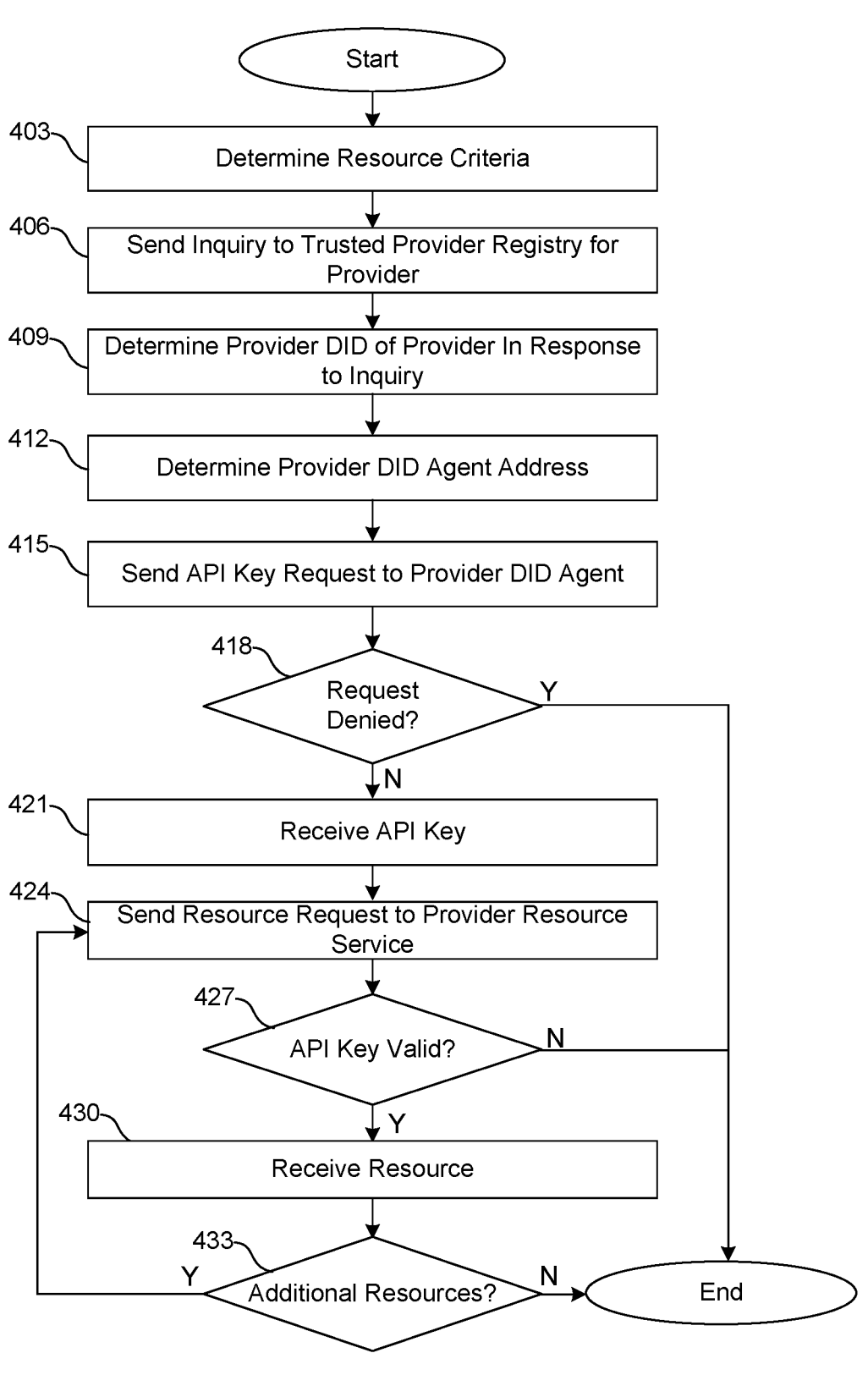

Referring next to FIG. 4, shown is a flowchart 400 that provides one example of the operation of a portion of the consumer service 133, the consumer DID agent 130 and/or other application. The flowchart 400 of FIG. 4 provides merely an example of the many different types of functional arrangements that can be employed to implement the operation of the depicted portion of the consumer service 133, the consumer DID agent 130 and/or other application. As an alternative, the flowchart 400 of FIG. 4 can be viewed as depicting an example of elements of a method implemented within the network environment 100.

Beginning with block 403, the consumer service 133 can determine resource criteria needed to satisfy or perform a given task using an API. In various examples, the consumer service 133 corresponds to an application uses APIs to access a resource needed by the application. For example, the consumer service 133 can correspond to an autonomous learning language model (LLM) agent (e.g., Auto-GPT) that orchestrates functionality in real-time is trained to respond to questions provided by a user. The context associated with the question or other event that requires the use of an API can be evaluated to determine the resource criteria. In this non-limiting example, a user can ask the following question: "How did XX stock price perform today and what do you expect to happen tomorrow?" In response, the consumer service 133 can extract intents and/or keywords from the question and, based at least in part on the intents and/or keywords, generate the resource criteria which can be used to identify an API that can provide the resources (e.g., stock price and future expectations) to allow the consumer service 133 to respond to the inquiry.

At block 406, the consumer service 133 can send an inquiry or API provider request to a trusted provider registry 112 to identify an API and/or API provider that can be used to satisfy and/or perform the task required by the consumer service 133. The trusted provider registry 112 can correspond to a registry of API providers and include information about different types of services associated with the APIs associated with the API providers. In various examples, the trusted provider registry 112 includes provider data 181 associated with the API providers. The provider data 181 can include API data 184, DIDs 139, and/or other data. The API data 184 can correspond to API metadata providing characteristics or properties of what a given API can provide and/or what the given API does. In some examples, the inquiry or API provider request can include the resource criteria to allow the trusted provider registry to identify one or more suitable APIs that can be used based at least in part on the resource criteria.

At block 409, the consumer service 133 can determine the provider DID 139 of an API provider that meets the requirements defined by the resource criteria. In some examples, the trusted provider registry 112 provides one or more DIDs 139 associated with API providers that meet the needs of the consumer service 133 based at least in part on the resource criteria. In other examples, the consumer service 133 can determine one or more API providers that meet the needs of the consumer service 133 by comparing the API data 184 of different API providers in the trusted provider registry 112 with the resource criteria. The DID 139 can be retrieved from the provider data 181 of a matching API provider in the trusted provider registry 112.

At block 412, the consumer service 133, via the consumer DID agent 130, can determine the address or pathway of the provider DID agent 118. In various examples, the consumer service 133 can send a request to the consumer DID agent 130 to determine the address of the provider DID agent 118 based at least in part on the DID 139. The consumer DID agent 130 can fetch the DID document 136 associated with the DID 139 of the API provider from the distributed identity ledger 109. The DID 139 can correspond to an address to a DID document 136 that includes information associated with the subject and is stored in the distributed identity ledger 109. The DID document 136 can include a uniform resource locator (URL) or other location address or pathway of the provider DID agent 118 that the consumer DID agent 130 can use to initiate a communication session with the provider DID agent 118. Accordingly, the consumer DID agent 130 identifies the address or pathway for the provider DID agent 118 in the DID document 136. In various examples, the consumer DID agent 130 notifies the consumer service 133 that the provider DID agent 118 is identified.

At block 415, the consumer service 133, via the consumer DID agent 130, can send an API key request to the provider DID agent 118. In various examples, the consumer service 133 can generate an API key request for requesting an API key 124 that can be used by the consumer service 133 to authenticate the consumer service 133 with the corresponding API. In various examples, the API key request can include a DID 139 associated with the consumer service 133 and/or other consumer subject associated with the consumer service 133. The consumer service 133 can send the API key request to the consumer DID agent 130 for transfer to the provider DID agent 118. The consumer DID agent 130 can then send the API key request to the provider DID agent 118. In various examples, the API key request is sent to the provider DID agent 118 via the pathway or address identified in the DID document 136. In various examples, the consumer DID agent 130 can establish a communication session with the provider DID agent 118 at the time of sending the API key request. In other examples, the consumer DID agent 130 can establish the communication session with the provider DID agent 118 prior to sending the API key request.

At block 418, the consumer service 133 can determine if the request for the API key 124 is denied. In various examples, if the provider DID agent 118 is unable to verify the consumer service 133 (or associated consumer subject), the provider DID agent 118 can return a notification to the consumer DID agent 130 indicating that the request for the API key 124 is denied. The consumer DID agent 130 can then notify the consumer service 133 that provisioning of the API has failed. If the request has been denied, this process can proceed to completion. However, if request is not denied, the process can proceed to block 421.

At block 421, the consumer service 133, via the consumer DID agent 130, can receive the API key 124 from the provider DID agent 118. In various examples, the provider DID agent 118 transmits the API key 124 to the consumer DID agent 130 in response to issuing the API key 124. In various examples, the API key 124 can be transmitted to the consumer DID agent 130 in the form of a VC 142 where the API key 124 is a claim of the VC 142 and permission associated with the use of the API key 124 are defined by claims of the VC 142. The consumer DID agent 130 can store the API key 124. For example, the consumer DID agent 130 can store the API key 124 and/or VC 142 including the API key 124 in the client wallet 169 and/or other data store associated with the client device 106. In various example, the consumer DID agent 130 notifies the consumer service 133 of the receipt of the API key 124. In some examples, the notification to the consumer service 133 can include the API key 124 and/or the VC 142 including the API key 124. In other examples, the notification can indicate a location at which the API key 124 is stored so that the consumer service 133 can access the API key 124 when needed to invoke an API associated with the API key 124.

At block 424, the consumer service 133 can send a resource request to the provider resource service 121. In various examples, the consumer service 133 can send the resource request by invoking an API call associated with the provider resource service 121. In various examples, the provider resource service 121 is a gateway service for the API. In various examples, the resource request can include the API key 124, the VC 142 including the API key 124, and/or a cryptographic proof of the API key 124.

At block 427, the consumer service 133 can determine if the API key 124 is valid. For example, if the consumer service 133 is unable to be authenticated by the provider resource service 121, the consumer service 133 can receive a notification that the resource request has been denied, thereby indicating that the API key 124 is invalid. If the API key is invalid, this portion of the process can proceed to completion. Otherwise, the process can proceed to block 430.

At block 430, the consumer service 133 can receive the resource from the provider resource service 121. For example, the provider resource service 121 obtains the resources associated with the resource request and transmits the requested resource to the consumer service 133. In particular, the provider resource service 121 can respond to the invoked API call by providing the consumer service 133 with the information request. Upon receiving the requested resource, the consumer service 133 can proceed with performance of the task that required the information that initiated the API call and need for the requested resource.

At block 433, the consumer service 133 can determine if additional resources accessible through the API are required by the consumer service 133. If additional resources are required, the consumer service 133 can return to block 430 and the provisioned API key 124 can be used in additional resource requests. Otherwise, this portion of the process can proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
    identify a provider decentralized identifier (DID) associated with an application programming interface (API) provider; and
    establish a communication session with a provider DID agent associated with the API provider;
    send a request for API key for access to a resource provided by the API provider, the request for the API key being transmitted via the communication session;
    obtain a verifiable credential (VC) in response to the request, the VC comprising the API key;
    submit an API call to an API provider service associated with the API provider for the resource; and
    receive the resource from the API provider service in response to the API call and proving ownership of the API key.

2. The system of claim 1, wherein the API call comprises the VC or a cryptographic proof of the API key.

3. The system of claim 1, wherein the machine-readable instructions further cause the computing device to at least query a trusted provider registry to identify the API provider.

4. The system of claim 1, wherein the request includes a DID associated with a user of the computing device, the VC with the API key being obtained in response to the user being verified based at least in part on the DID.

5. The system of claim 1, wherein the resource comprises a first resource, the API call comprises a first API call, and the machine-readable instructions further cause the computing device to at least:
    submit a second API call to the API provider service, the second API call comprising the API key or a cryptographic proof of the API key; and
    receive a second resource from the API provider service in response to the second API call.

6. The system of claim 1, wherein the VC is issued by the provider DID agent associated with the API provider service, and the VC being obtained via the communication session.

7. A method, comprising:
identifying an application programming interface (API) provider for obtaining a resource based at least in part on one or more resource criteria;
obtaining a decentralized identifier (DID) associated with the API provider from a trusted provider repository;
initiating an API key request for an API key to a provider DID agent identified from a DID document associated with the DID
determining that the API key has been provided; and
sending an API resource request for the resource to an API service provider, the API resource request including the API key.

8. The method of claim 7, wherein the API provider is one of a plurality of API providers and the trusted provider repository comprises API data associated with a plurality of APIs provided by a plurality of API providers.

9. The method of claim 8, wherein the API provider is identified based at least in part on a comparison of the one or more resource criteria and the API data associated with the plurality of APIs provided by the plurality of API providers.

10. The method of claim 7, wherein initiating the API key request comprising establishing a communication with the provider DID agent via a uniform resource locator (URL) obtained from the DID document.

11. The method of claim 7, further comprising receiving a verifiable credential (VC) from the provider DID agent, the API key being included in the VC.

12. The method of claim 11, wherein the API resource request comprises an API call, and the API key being included in the API call as the VC or a cryptographic proof associated with the API key.

13. The method of claim 7, wherein the DID comprises a provider DID and the API key request including a consumer DID associated with a user, the API key being provided in response to the user being verified by the provider DID agent based at least in response to the DID.

14. A system, comprising:
a computing device comprising a processor and a memory; and
machine-readable instructions stored in the memory that, when executed by the processor, cause the computing device to at least:
    receive a request for an application programming interface (API) key from a decentralized identifier (DID) agent associated with a user;
    verify the user based at least in part on a verification of a credential document associated with the user;
    generate a verifiable credential (VC) including the API key; and
    transmit the VC to the DID agent.

15. The system of claim 14, wherein the request comprises a DID associated with the user.

16. The system of claim 15, wherein the machine-readable instructions, when executed by the processor, further cause the computing device to at least:
    fetch a DID document associated with the user from a distributed identity ledger, the DID document being fetched based at least in part on the DID associated with the user.

17. The system of claim 16, wherein the credential document is obtained via the DID document.

18. The system of claim 14, wherein the machine-read-able instructions, when executed by the processor, further cause the computing device to at least:

generate a mapping associating the API key with the DID of the user; and provide the mapping to an API provider service.

19. The system of claim 14, wherein the VC further defines at least one of an expiration date for the VC or one or more limitations for using the API key.

20. The system of claim 1, wherein the machine-readable instructions, when executed by the processor, further cause the computing device to at least obtain the DID associated with the API provider from a trusted provider repository.

\*   \*   \*   \*   \*